United States Patent
Yamamoto (10) Patent No.: US 6,944,690 B2
(45) Date of Patent: *Sep. 13, 2005

(54) DIRECT ACCESS STORAGE SYSTEM HAVING PLURAL INTERFACES WHICH PERMIT RECEIPT OF BLOCK AND FILE I/O REQUESTS

(75) Inventor: Akira Yamamoto, Kawasaki (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/801,685

(22) Filed: Mar. 17, 2004

(65) Prior Publication Data

US 2004/0177174 A1 Sep. 9, 2004

Related U.S. Application Data

(63) Continuation of application No. 09/829,470, filed on Apr. 9, 2001, now Pat. No. 6,779,063.

(51) Int. Cl.[7] .............................................. G06F 13/14
(52) U.S. Cl. .............................. 710/74; 710/2; 710/33; 711/100; 709/233
(58) Field of Search .............................. 710/2, 33, 74; 709/233; 711/100

(56) References Cited

U.S. PATENT DOCUMENTS

| | | | |
|---|---|---|---|
| 5,680,537 A | 10/1997 | Byers et al. | 714/5 |
| 5,828,823 A | 10/1998 | Byers et al. | 714/24 |
| 5,838,950 A | 11/1998 | Young et al. | 703/21 |
| 6,230,200 B1 | 5/2001 | Forecast et al. | 709/226 |
| 6,301,605 B1 | 10/2001 | Napolitano et al. | 709/201 |
| 6,574,667 B1 | 6/2003 | Blumenau et al. | 709/229 |
| 6,606,690 B2 | 8/2003 | Padovano | 711/148 |
| 2001/0037406 A1 | 11/2001 | Philbrick et al. | 709/250 |
| 2002/0156984 A1 | 10/2002 | Padovano | 711/148 |

Primary Examiner—Jeffrey Gaffin
Assistant Examiner—Angel L. Casiano
(74) Attorney, Agent, or Firm—Mattingly, Stanger, Malur & Brundidge, P.C.

(57) ABSTRACT

A storage system includes a storage controller and storage media for reading data from or writing data to the storage media in response to SCSI, NFS, CIFS, or HTTP type read/write requests. The storage controller includes SCSI, NFS, CIFS, and HTTP interface adapters for receiving the read/write requests and effecting the reading of data to or the writing of data to the storage media.

14 Claims, 5 Drawing Sheets

FIG_1

FIG_5

FIG_6

FIG_7

FIG_8

DIRECT ACCESS STORAGE SYSTEM HAVING PLURAL INTERFACES WHICH PERMIT RECEIPT OF BLOCK AND FILE I/O REQUESTS

The present application is a continuation of application Ser. No. 09/829,470, filed Apr. 9, 2001 now U.S. Pat No. 6,779,063, the contents of which are incorporated herein by reference.

BACKGROUND OF THE INVENTION

The present invention relates generally to data processing systems, and particularly to a direct access storage system with a combined block interface and file interface access.

Interconnecting the various elements of a processing system (e.g., processor units and peripheral equipment such as direct access storage devices) permits the resources of the system to be distributed so that they are available to all elements of the system. For example, multiple processor units may be connected to a storage system for sharing not only the afforded storage space, but the files that are stored there. Typically, a network architecture of one type or another will be used to implement the interconnection, which may dictate the particular of interface structure between the elements of a system, e.g., a processor unit and a data storage system. For example, it has been popular to connect stand-alone processor units to direct access storage devices using a small computer standard interface (SCSI). SCSI connections use block transfer protocols in which a logical unit number (LUN) identifies the logical volume for access.

Network protocols, on the other hand, are different. Protocols of choice for networked and distributed processing systems included Network File System ("NFS;" an open operating system developed by Sun Microsystems), a Common Internet File System protocol ("CIFS;" a remote file access protocol), or a HyperText Transport Protocol, more popularly known as "HTTP." These protocols use what is known as a "file system interface," and while the file interface structures used to implement the different file system interface protocols, they use a common file system structure. Thus, data stored on a storage system using a file system interface of two or more types are available to all host systems. For example, a storage system capable of handling input/output requests of both NFS and CIFS protocols, i.e., an NFS protocol interface and a CIFS protocol interface, can store data files that are accessible to host processors having either of the NFS interfaces. That is, a host system with only an NFS interface can access and open files stored by a host system with a CIFS interface, and the host system with a CIFS interface can access and open files stored by the system via the NFS interface —provided the storage system has both interfaces.

Storage systems having one or more of the file system interfaces of the types described above provide access through an I/O read or write request that includes a file name, and an lock request that seeks a right to access the particular file of the I/O request.

Most direct access storage systems have either a block interface or a file interface, and host systems using a block interface protocol cannot access storage systems employing file interface protocols. Further, because of the differences between block and file interface structures and the way data is stored and accessed, a storage system is structured for a block system or a file system, but not both.

SUMMARY OF THE INVENTION

The present invention provides a storage system with direct access storage devices that can be shared between a block interface and a file interface. The invention provides a system architecture with both block and file interfaces to realize high performance, scalability, and availability.

According to the present invention a storage system includes a plurality of physical disk units, a host processing system that may include a number of processing units, and a controller element that includes a SCSI interface adapted to receive block type read/write requests and at least one file system interface adapted to receive I/O read/write file requests. The file system interface may be compatible with a network file system (NFS), a Common Internet File System (CIFS) protocol or HyperText Transfer Protocol (HTTP), or any combination of file system protocols. The controller element operates to connect the processor units of the host processing system to the plurality of physical disk units. The controller unit uses logical volume management, allowing the different block and file system I/O requests to access portions of the physical disk units allocated for block system data or file system data.

In an alternate embodiment of the invention, file system data stored on the physical disk units is made accessible to a block system request by performing a volume backup, thereby permitting data sharing between a SCSI interface and a file system interface. A number of advantages are achieved by the present invention. First, is that direct access storage device ("DASD") resources can be shared between those processing elements having only a block interface, and those processing elements having a file system interface or multiple file system interfaces.

DESCRIPTION OF THE PREFERRED EMBODIMENTS

Figure 1:
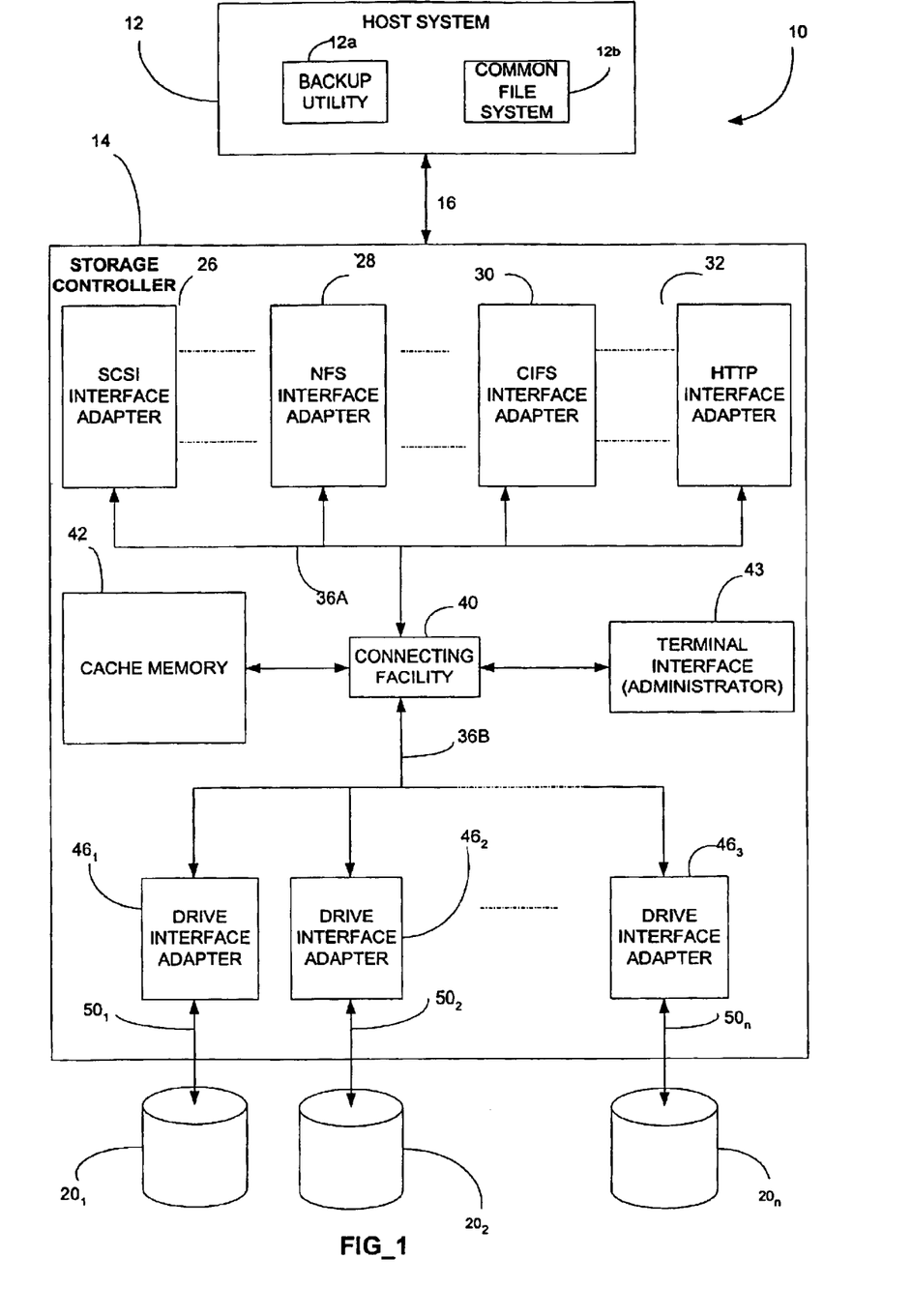
FIG. 1 is a block diagram illustration of processing system that includes a storage system constructed according to the teachings of the present invention.

Turning now to the figures, and first to FIG. 1, there is illustrated a processing system 10 that includes a host system 12 coupled to a storage system comprising a storage controller 14 and a plurality of physical disk units 20 ($20_1$, $20_2$, ..., $20_n$) that are managed by the storage controller 14.

Although not specifically shown, the host system 12 most likely will comprise a plurality of processor units, although it could also comprise a single processor unit with multiple I/O interfaces, including a block system interface and at least one file system interface. It should be understood, therefore, that the host system however implemented will include at least one SCSI protocol type interface (for block system file transfers with the storage controller 14) and at least one file system interface, such as an interface or interfaces that operate according to NFS, CIFS, and/or HTTP protocols. Accordingly, the host system may comprise multiple processor units, one having an SCSI interface, another with an NFS interface, still another with a CIFS interface, and so on. Alternatively, the host system may be implemented by a single processor unit having all four (SCSI, NFS, CIFS, and HTTP) type interfaces.

As FIG. 1 shows, the host system will include, according to an aspect of the present invention, a backup utility 12a, shown in phantom in FIG. 1, a common library system library data structure 12b. These programmatic elements are included in that portion of the host system 12 having the SCSI type interface to implement said aspect of the invention. They are described more fully below.

The host system 12 is coupled to the storage controller 14 by a bus structure 16. For reasons that will become clearer below, the bus system 16 may be multiple bus structures to connect the host system to corresponding ones of four interface adaptors 26–32 of the storage controller 14.

As FIG. 1 shows, the storage controller 14 includes four types of interface adaptors: a SCSI interface adaptor 26, a NFS interface adaptor 28, a CIFS interface adaptor 30, and a HTTP interface adaptor 32. Each is configured to handle a specific protocol. Accordingly, the SCSI interface adaptor 26 is configured to receive, from the host system 12, SCSI or block system protocol type input/output requests. As is conventional, a block system protocol request will include a logical unit number, a block identification (ID) within the specified logical unit, and data link. File system protocol requests, depending upon type, are received by the NFS, CIFS, and/or HTTP interface adaptors 28, 30, 32. File system protocol requests will typically utilize an upper layer protocol of TCP/IP that includes an identification of a specific file name rather than a logical unit number.

The storage system 14 may have any number of any type of the interface adapters 26–32. For example, a storage controller 14 configuration may include two (2) SCSI interface adaptors 26, one (1) NFS interface adaptor 28, three (3) CIFS interface adaptors 30, and two (2) HTTP interface adaptors 32. Alternatively, another storage controller 14 configuration may have just four interface adapters, one of each type, with the capability of having more adapters of any type added. As can be seen, a variety of other alternative storage controller configurations are possible. By providing the storage controller 14 with such a flexible architecture, high scalable performance and high availability is achieved. This, in turn, provides a storage system controller 14 with the capability of increasing, for example, the number of NFS interface type adapters according to performance demands placed upon the storage system by the host system 12. Moreover, by providing the storage controller 14 with multiple interface adapters of the same type (e.g., NFS interface adapters) a failure of one still leaves the other or others of that same type to execute the requested processing from the host system.

Continuing with FIG. 1, the various adaptors 26, . . . , 32 of the storage controller 14 connect to drive interface adaptors 46, one for each physical disk unit 20, through a system bus 36A, 36B, and a connecting facility 40. The connecting facility is basically an arbiter that functions to arbitrate communicative access between the various interface adaptors 26, . . . , 32 and the drive interface adaptors 46. In addition the connecting facility 40 will also arbitrate access for the interface adaptors 26, . . . , 32 to the cache memory 42.

Although FIG. 1 shows only one drive interface adapter 46 for each physical disk unit 20, in order to provide fault tolerant capability, as well as increased performance, the physical disk units 20, or any of them, may have two or more drive interface adapters 46 servicing them. Each disk unit is connected to an interface adapter by a connection 50.

The storage controller 14 also includes a terminal interface adaptor 43 to provide a system administrator with access to the storage controller for configuration purposes, as will be discussed more fully below.

Figures 2, 3, 4:
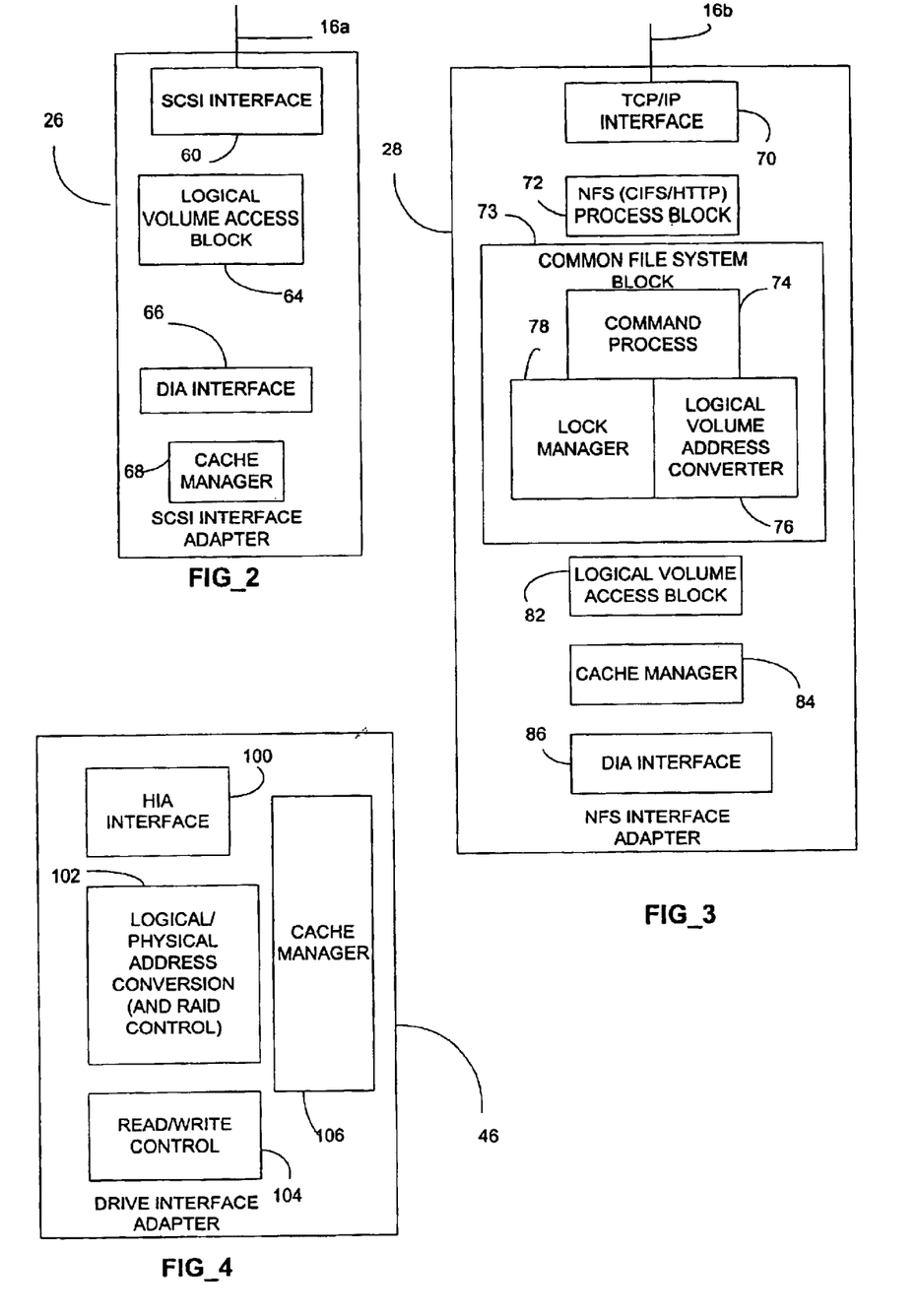
FIG. 2 is a block diagram broadly depicting the SCSI interface adaptor shown in FIG. 1.
FIG. 3 is a block diagram broadly depicting a files system interface adaptor as shown in FIG. 1.
FIG. 4 is a block diagram that illustrates a drive interface adaptor as shown in FIG. 1.

Referring now to FIG. 2, there is illustrated in block diagram form the SCSI interface adaptor 26. The SCSI interface adaptor 26, as are the file system and drive interface adaptors 26, 46 (FIGS. 3 and 4), are illustrated in terms of the major functions performed by each. It will be evident to those skilled in this art that the functional aspects of the adaptors 26, 28, and 46 may be implemented in a variety of known ways such as, for example, with programmed microprocessors and associated support circuitry, state machines, or a combination of such construction with or without additional circuitry.

As FIG. 2 shows, the SCSI interface adaptor 26 will include an SCSI interface function and circuitry configured to be coupled to a compatible SCSI interface of the host system 12. The SCSI interface adaptor 26 operates to receive I/O read or write requests from the host system 12, and to communicate responses back to the host system 12. For that purpose, the SCSI interface adaptor 26 includes a SCSI interface function 60 for handling the protocol needed for SCSI data communication.

As will be seen, the storage controller 14 employ a logical volume management in order to share the resources of the physical disk units 20 between block system and file system interfaces. Accordingly, the SCSI interface adaptor includes a logical volume access block function 64 that is configured to convert the LUN of a I/O read write request to a logical volume access. Also included in the SCSI interface adapter 26 is a drive interface adaptor (DIA) interface function 66 to handle the communication colloquy with the drive interface adaptors 46 in response to information provided by the logical volume access block 64. A conventional cache manager function 68 manages data access of the SCSI interface adapter 26 to the cache memory 42 by the SCSI interface adaptor 26.

The NFS interface adaptor 28 is functionally illustrated in FIG. 3. The other file system interface adapters, i.e., the CIFS and HTTP interface adapters are functionally equivalent to the NFS interface adapter, with the exception of the process block 72, so that the description of the NFS interface adapter 28 will apply equally to the CIFS and HTTP interface adapters 30 and 32 unless otherwise noted. As FIG. 3 shows, the NFS interface adaptor includes a TCP/IP interface function 70 for handling I/O requests and responses thereto between the storage controller 14 and an NFS interface of the host system 12 according to the communications protocols incorporated in TCP/IP. A process block 72 operates to interpret the NFS features of an I/O read or write request, and formulates the responses thereto for communication to the host system 12 (FIG. 1). For a CIFS or HTTP interface adapter, the process block function 72 would need to be configured to accommodate the particular protocol. A common file system function block 73 includes a command process function 74, a logical volume address converter function 76, and a lock manager function 78. The common file system function block 73 will receive an I/O read or write request from the TCP/IP interface function 70, convert the file interface information of the request to block interface information, and pass the block interface information to a logical access function 82 (which is substantially the same as that of the SCSI interface adapter 26). Then, the logical volume access function 82 forwards that request to a logical volume that maps to a portion of the physical storage space implemented by the physical disk units 20.

As did the SCSI interface adaptor 26, the NFS interface adaptor 28 includes a cache manager function 84 for managing accesses to the cache memory 42 (FIG. 1) and a drive interface adapter (DIA) function 86 for handling data communication with a drive interface adaptor 46.

FIG. 4 illustrates the functional features of a drive interface adaptor 46. As FIG. 4 shows, the drive interface adaptor 46 will include a host interface adapter (DIA) interface function 100 to handle communication with a particular interface adaptor 26, 28, . . . , 32. A logical/physical address conversion function 102 converts logical addresses received from the logical volume access block functions of the interface adapters (e.g., logical volume access block 64 of the SCSI interface adaptor 26, or the logical volume access blocks 64 in either of the NFS, CIFS, or HTTP interface adaptors 28, 30, 32). If a redundant array of inexpensive disk (RAID) architecture is implemented, the logical/physical address conversion function 102 will operate to manage that architecture, handling the mirroring of data in the case of a RAID 1 architecture, for example, or controlling the data striping employed in a RAID architecture.

A cache manager function 106 of the drive interface adaptor 46 manages data accesses with the cache memory 42. A Read/Write control function 104 handles the actual data flow, pursuant to a read or a write request, between the drive interface adaptor 46 and the associated physical disk unit 20.

Operation of the system of FIG. 1 in connection with a block system I/O request is generally as follows. Block system I/O read or write requests will be received by the SCSI interface adaptor 26 on a SCSI bus 16a (FIG. 2). Such requests, as indicated above, will have a LUN which includes a block ID in the specified LUN and a data length as is conventional. The request will be received by the SCSI interface function 60 and passed to the logical volume access block function 64. If the request is an I/O read request, the logical volume access function will first check, through the cache manager 68, to see if the requested data resides in the cache memory 42 (e.g., from a prior read request for the data, or from a prior write of the data to the physical disk units 20). If so, the logical volume access block function 64 will access the cache memory 42 for the block identified in the I/O read request, and forward it to the SCSI interface function 60. The SCSI interface function 60, in turn, will forward the requested data to the host system 12. If, however, the requested block does not exist in the cache memory 42, the logical volume access block will send a request, through the DIA interface 66, to the HIA interface 100 of the drive interface adaptor 46 for the physical storage 20 whereat the requested data block resides. The SCSI interface adaptor will then wait for a response, performing other processing as necessary.

If, on the other hand, the I/O request received from the host system 12 is a write request, the logical volume access function 64 will send the data block received with the request to the cache memory 42. Then, the logical volume access function 64 will, through the DIA interface function 66, send a write request to appropriate the drive interface adaptor 46, identifying the location in the cache memory 42 at which the data block to be written resides. The drive interface 46 will then access the cache memory 42 for the data block, and write it to physical storage 20.

File system requests are received by one of the file system interfaces: either the NFS, the CIFS, or the HTTP interface adapter, depending upon whether the source is a NFS, CIFS, or HTTP interface of the host system 12 and, therefore, one of the three protocols file system protocols: that is, NFS, CIFS, or HTTP. File system I/O requests may be accompanied by lock/unlock requests. A lock request seeks access to a specific data block within a specific file, or the file itself. An unlock request releases access to the block/file previously obtained. As is conventional, an lock or unlock request will include either the file name of the file sought to be accessed, or a block number in the specified file, and a block length. Alternatively, the request may include a file name and additional information identifying the right to access the file.

Control information for lock/unlock processing is stored in the cache memory 42 for the each of the protocols used by the file system interface adaptors 28, 30, 32, although other shared memory can be used if available.

File system I/O requests issued by the host system 12 are received by the TCP/IP interface function of the file system interface adaptor to which the request is directed. (That is, if an NFS host interface issues the request, the request will be received by the NFS interface adaptor 28. Similarly, for CIFS or HTTP host interfaces, the requests will be received by the CIFS or HTTP interface adaptors 30, 32 respectively. The requests will all, thereafter be handled in basically the same way as described hereinafter.) The TCP/IP interface function 70 will receive the request and pass it to the appropriate process function block 72 for further processing.

The process function block 72 will convert the received request to one for a common file system, and pass the converted request to the common file system function block 73 where it is received by a command process function 74 and transferred to a logical volume address converter function 76.

If the request is a lock request, it will also be passed to the lock manager function 78, which checks to determine whether or not access to the requested file is available. If access is available, the lock manager function 78 will initiate a reply ("access granted") to the process function block 72. The process function block 72 will then notify the host system 12 of the access grant via the TCP/IP interface function 70. Generally, the locking protocol is specified in NFS, CIFS, or HTTP level. If, on the other hand, access is not available, for example being locked by another request, the lock manager function 78 will so notify the process function 72, which will send a request to host system 12 to pend the lock request. When the lock request is subsequently made available by release of the lock by the other request, the lock manager 78 will notify the host system 12 that access is granted.

I/O read or write requests from a file system interface of the host system 12 will include a file name, a block number in the specified file, and a block link. Read and write requests travel through the TCP/IP interface function 70, the process function block 72 and the command process function 74, to the logical volume address converter 76. There, the information in the request is converted to a logical volume unit number, a block number in the logical volume, and a logical block length. The logical address converter 76 will then pass this information to the logical volume access function block 64 which, as did the logical volume access function block 64 of the SCSI interface adaptor 26, will handle the data transfer in the same way; that is, if it is a read request, the logical volume access function block 82 will check to see if the requested information resides in the cache memory 42 and if so, retrieve the information and return it to the host system 12 in response to the request. If the requested information does not reside in the cache memory 42, the logical volume access function block 82 will issue a request to the appropriate drive interface adaptor 46, requesting that the information be retrieved from the physical storage 20. Write requests are also handled in the same manner as described above respecting the logical volume access block 64 of the SCSI interface adapter.

The drive interface adapters 46 will operate in the same manner when responding to read or write requests, regardless of the interface adapter issuing the request. It will execute read/write operations to and from the physical storage 20 in response to requests received from the interface adapters 26, . . . , 32. The drive interface adapters 46 preferably have the capability of performing write after processing from cache memory 42. (Write after processing is typically used, for example, in connection with mirrored storage. A write request will be processed by writing the data of the request to a specific physical storage unit 20. Subsequently, the same data, which may be stored in the cache memory 42, can be written to whatever disk storage unit (or units) 20 used for mirroring the data.)

Referring to FIG. 4, requests are received at the drive interface adapter 46 through the HIA (host interface adapter) interface function 100. Requests will include a logical-physical address that maps to an address in the physical storage 20 managed by the drive interface adapter 46. Conversion of the received logical-physical address to an address of physical storage 20 is performed by the logical/physical address conversion function 102, which may also be structured to execute write after processing if, for example, RAID architecture that implements mirroring is used, e.g., RAID 1.

The configuration of logical volumes may be established by a system administrator through a work station (not shown) connected to the storage controller 14 (FIG. 1) through the terminal interface 43. The system administrator may create data structures, for example in the form of the table 120 illustrated in FIG. 5. Each entry $122_1$, . . . , $122_m$ of the table 120 corresponds to a logical volume established by the system administrator. And, each entry 122 contains information describing the logical volume, including the mapping to the physical storage space 20. In addition, each entry 122 may contain an identification as to whether or not it is for a block system interface or a file system interface.

Logical volumes allow the physical storage 20 to be allocated between a block system and a file system as needed. For example, a first portion of the physical storage 20, say, one-third of the storage, may be allocated to block system data storage. Then, the remaining physical storage may be allocated to storing data for file system protocols. Later, it may be determined that less block system storage is actually needed so that the allocation could be changed, for example, something less than originally allocated, say one-fourth of the physical storage 20. The remaining physical storage 20 dedicated to file system storage is concomitantly increased.

Figure 5:
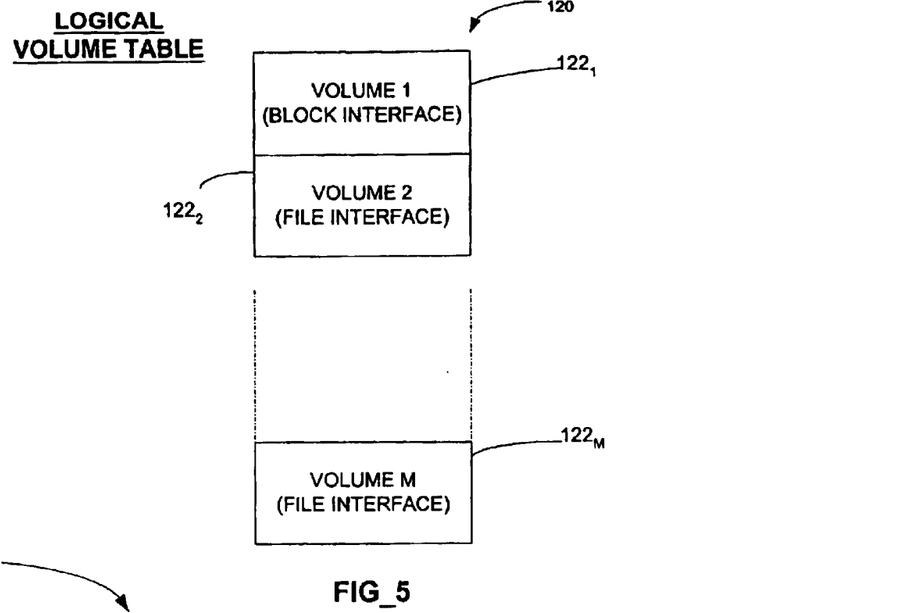
FIGS. 5 and 6 illustrate two types of logical volume status tables as used in connection with the present invention.

Typically, logical volumes for a file system interface (e.g., the NFS or CIFS interface adapters 28, 30) will include file management information required by the common file system function block 73. This file management information provides the basis for the logical volume address conversion performed by the logical volume address converter 76 of the common file system block 73. Logical volume information for block system interface, i.e. the SCSI interface adapter 26, typically do not have such information, making it very difficult to access a logical volume for a block interface from a file interface. Therefore, in order to preclude unnecessary errors, status information can be included in each entry 122 for the logical volume, identifying whether that volume is a file system or a block system logical volume. Thus, as FIG. 5 illustrates, the entry $122_1$ for logical volume 1 contains information to identify it as a block system logical volume, whereas the entry $122_2$ for logical volume 2 contains information identifying it as a file system logical volume.

There is, however, a way, according to the present invention, of accessing a logical volume for a file system from a block system interface, such as the SCSI interface adaptor 26. According to this aspect of the invention, that portion of the host system 12 having a SCSI interface is provided with a backup utility 12a (FIG. 1) that, when running, can issue a volume backup request to the SCSI interface adaptor 26 of the storage controller 14.

This will cause the entire logical volume identified in the request to be read from the physical storage 20, from the first address to the last address of the logical volume, without consideration of management information. The same portion of the host system 12 is also provided with the common file system library 12b, which provides the ability to recognize the file management information of the common file system function 73. Thereby, the host system 12 can access an arbitrary file on a logical volume for a file system from an interface of a block system. (Thus, by using a common file system library, the host system 12 to access a file on a logical volume for a file interface through a block system interface (e.g., a SCSI interface, since a common file system library can recognize the file management information of the common file system function 73,)

Figure 6:
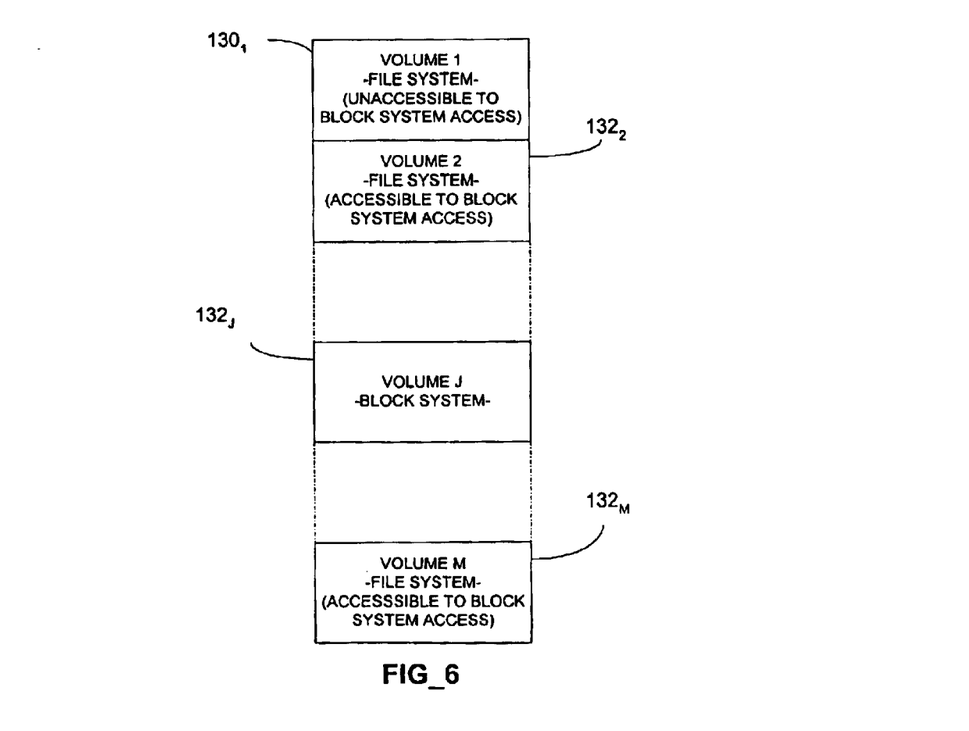

In order to provide at least a modicum protection against inadvertent or other access of file system data from a block system interface or adapter, the logical volume table information could include information respecting whether or not the particular logical volume is accessible to certain types of access. For example, a file system logical volume would include information that it was or was not accessible from a block system access. Thus, as indicated in FIG. 6, the logical volume table entry $132_1$ for logical volume 1 contains information identifying it as a file system volume, inaccessible to a block system access. Conversely, the entry $132_2$ indicates that logical volume 2 is also a file system volume, but it is accessible to a block system access. Similarly, the entry $132_M$ for volume M is also a file system logical volume, accessible to a block system access. The entry $132_J$ is, on the other hand, a block system logical volume.

Figure 7:
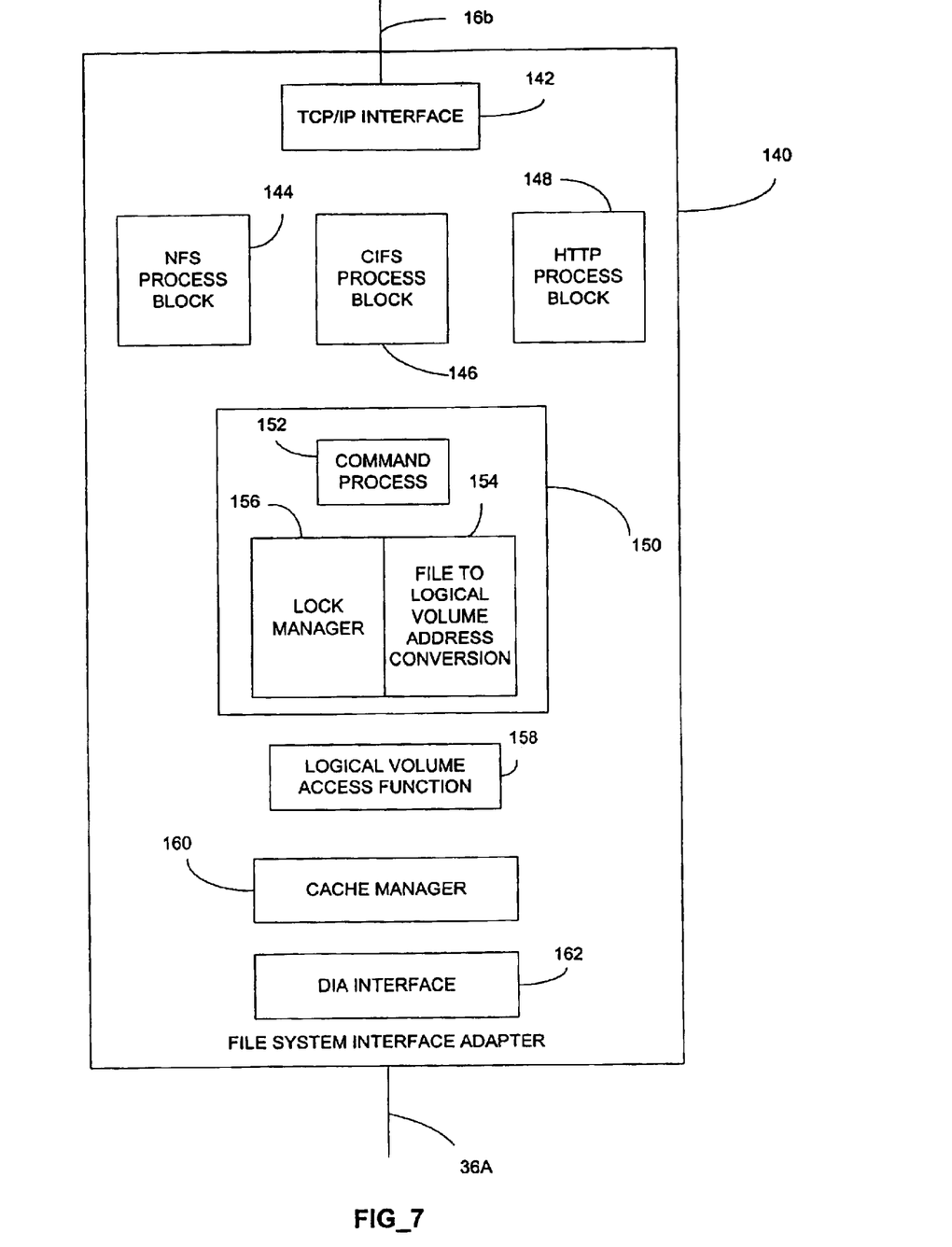
FIG. 7 illustrates a file interface adaptor according to an alternate embodiment of the invention.

Turning now to FIG. 7, there is illustrated an alternate embodiment of the invention. The storage controller 14 of FIG. 1 is illustrated as having three separate file system interface adapters 28, 30, and 32, one each to NFS, C1FS, OR CIFS type protocols. However, as FIG. 7 illustrates, the storage controller 14 may alternatively have a common file system adapter 140 for handling all three file system protocols (i.e., NFS, CIFS, or HTTP) in a single interface adapter 140. As shown, I/O and other requests from the host system 12, whether NFS, CIFS or HTTP, are received by a TCP/IP interface function 142. The TCP/IP interface determines the particular communication protocol and passes the request to the appropriate one of the process function blocks including NFS process block 144, CIFS process block 146 and HTTP process block 148. From there, processing proceeds as described above. Similar to, for example, FIG. 3 the single interface adaptor 140 includes a common file system function block 150 which includes a command process function 152, a logical volume address converter function 154 and a lock manager function 156. Further, similar to FIG. 3, the single interface adaptor 140 includes a logical volume access function block 158, a cache manager function block 160 and a DIA interface function block 162. For enhanced reliability and faster access to the physical disk units 20, the storage system 14 may include multiple interface adapters 140.

Figure 8:
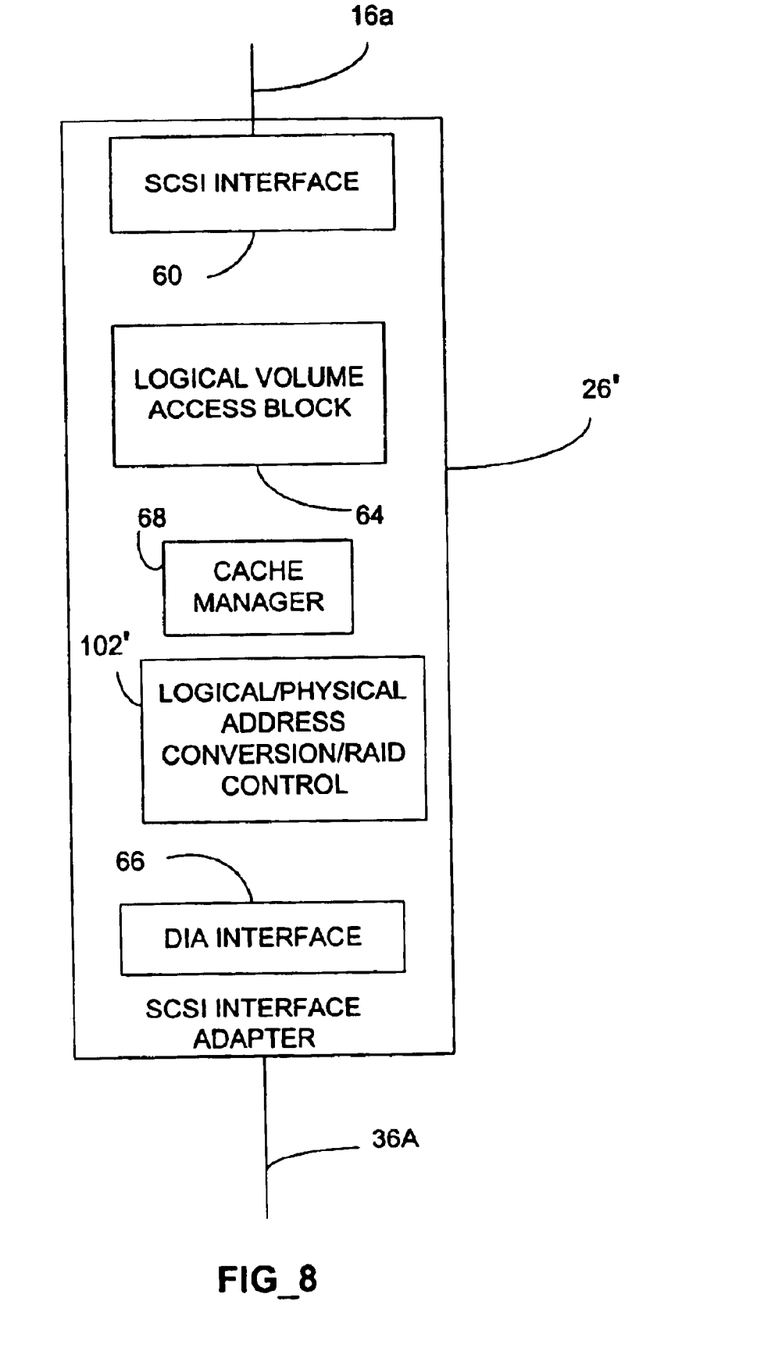
FIG. 8 is an alternate embodiment of a SCSI interface adapter for use in the storage controller of FIG. 1.

Turning now to FIG. 8, there is a further embodiment of the invention illustrated. In this embodiment, the SCSI interface adapter, designated with the reference numeral 26', includes the logical/physical address conversion/RAID control function 102', that was contained in the drive interface adapter 46 (FIG. 4) of the embodiment illustrated in FIG. 1. Similarly, the NFS, CIFS, and HTTP interface adapters 28, 30, 32 could also have the logical/physical address conversion 102' included in them, thereby removing that function from the drive interface adapters 46. Alternatively, if the file system interface adapter 140 shown in FIG. 7 is used, that could also include the logical/physical address conversion 102'.

What is claimed is:

1. A storage system for handling input/output (I/O) requests from a plurality of processors, comprising:
a storage media including a plurality of disk units;
a first interface adaptor to be coupled to a first processor of the processor; and
a second interface adaptor to be coupled to a second processor of the processor,
wherein the first interface adaptor is configured to receive a first block I/O request from the first processor, and determine a first logical volume to be accessed by the first processor based on the first block I/O request, the first logical volume being mapped to a first portion of the storage media,
wherein the second interface adaptor is configured to receive a file I/O request from the second processor, and
convert the file I/O request to a second block I/O request.

2. The storage system of claim 1, wherein the second interface adaptor is configured to determine a second logical volume to be accessed by the second processor based on the second block I/O request, the second logical volume being mapped to a second portion of the storage media.

3. The storage system of claim 2, wherein the file I/O request includes information specifying a file to be accessed by the second processor, and wherein the second logical volume is determined based on the information.

4. The storage system of claim 1, wherein the first block I/O request includes a logical unit number, and wherein the first logical volume is determined based on the logical unit number.

5. The storage system of claim 1, wherein the first block I/O request conforms to Small Computer Standard Interface (SCSI) protocol.

6. The storage system of claim 1, wherein the file I/O request conforms to either Network File System (NFS) protocol, Common Internet File System (CIFS) or HyperText Transport Protocol.

7. In a storage system with a storage media including a plurality of disk units, a method for handling input/output (I/O) requests from a plurality of processors, comprising:
when receiving a block I/O request from a first processor of the processors;
determining a first logical volume to be accessed by the first processor based on the first block I/O request, the first logical volume being mapped to a first portion of the storage media,
when receiving a file I/O request from a second processor of the processors;
converting the file I/O request to a second block I/O.

8. The method of claim 7, further comprising the step of:
determining a second logical volume to be accessed by the second processor based on the second block I/O request,
wherein the second logical volume is mapped to a second portion of the storage media.

9. The method of claim 8, wherein the file I/O request includes information specifying a file to be accessed by the second processor, and
wherein the second logical volume is determined based on the information.

10. The method of claim 7, wherein the first block I/O request includes a logical unit number, and
wherein the first logical volume is determined based on the logical unit number.

11. The method of claim 7, wherein the first block I/O request conforms to Small Computer Standard Interface (SCSI) protocol.

12. The method of claim 7, wherein the file I/O request conforms to either Network File System (NFS) protocol, Common Internet File System (CIFS) or HyperText Transport Protocol.

13. A method in a storage system, to be coupled to a storage media including a plurality of disk units, for handling input/output requests from a plurality of processors, wherein a first processor of said processors sends block I/O requests and a second processor of said processors sends file I/O requests, said method comprising:
receiving block I/O requests from said first processor in a first interface;
accessing a first portion of said storage media based on the block I/O requests;
receiving file I/O requests from said second processor in a second interface; and
accessing a second portion of said storage media based on the file I/O requests,
wherein storing data in response to said block I/O requests and said file I/O requests in a cache memory, coupled to said first and second interface.

14. A storage system for handling input/output (I/O) requests from a plurality of processors, wherein a first processor of the processors sends block I/O requests and a second processor of said processors sends file I/O requests, said storage system comprising:
a storage media including a plurality of disk units;
a bus coupled to said storage media;
a cache memory, coupled to said bus, storing data in response to said block I/O requests and said file I/O requests; and
a plurality of interfaces, coupled to said cache memory, to be coupled to said first and second processors,
wherein a first interface of said interfaces, coupled to said first processor, receives block I/O requests from said first processor to access a first portion of said storage media,
wherein a second interface of said interfaces, coupled to said second processor, receives file I/O requests to access a second portion of said storage media, and
wherein a physical storage corresponding to said first portion of said storage media can be reallocated as a physical storage corresponding to said second portion of said storage media.

* * * * *